United States Patent [19]

Bacino et al.

[11] Patent Number: 5,286,568
[45] Date of Patent: Feb. 15, 1994

[54] ELECTRICALLY CONDUCTIVE GASKET MATERIALS

[75] Inventors: John E. Bacino, Landenberg; James R. Hanrahan, Springfield, both of Pa.

[73] Assignee: W. L. Gore & Associates, Inc., Newark, Del.

[21] Appl. No.: 954,426

[22] Filed: Sep. 30, 1992

Related U.S. Application Data

[63] Continuation of Ser. No. 680,444, Apr. 4, 1991.

[51] Int. Cl.$^5$ .................... B32B 27/00; B32B 3/26
[52] U.S. Cl. ........................... 428/422; 428/318.6
[58] Field of Search .................. 428/422, 318.6

[56] References Cited

U.S. PATENT DOCUMENTS

| | | |
|---|---|---|
| 3,486,967 | 12/1969 | Fisher . |
| 4,576,861 | 3/1986 | Kato ................... 428/422 |
| 4,839,221 | 6/1989 | Asaumi et al. .......... 428/422 |
| 4,946,736 | 8/1990 | Sassa ................... 428/422 |
| 5,128,209 | 7/1992 | Sakai et al. ............ 428/422 |

FOREIGN PATENT DOCUMENTS

| | | |
|---|---|---|
| 0208138 | 1/1987 | European Pat. Off. . |
| 0437979 | 7/1991 | European Pat. Off. . |
| 3708706 | 10/1988 | Fed. Rep. of Germany . - |
| 2139144 | 11/1984 | United Kingdom ........ 428/198 |

OTHER PUBLICATIONS

World Patents Index Latest Derwent Publications Ltd., London, GB; AN 81-82346D & JP,A,56 121 202 (Sumitomo Elec) Sep. 24, 1981.

*Primary Examiner*—George F. Lesmes
*Assistant Examiner*—Blaine Copenheaver
*Attorney, Agent, or Firm*—David J. Johns

[57] ABSTRACT

This invention provides porous electrically-conductive gasket materials having thin porous coating layers that provide good release properties from clamping surfaces and that provide good electrical conductivity.

6 Claims, No Drawings

ELECTRICALLY CONDUCTIVE GASKET MATERIALS

This application is a continuation of application Ser. No. 07/680,444 filed Apr. 4, 1991, now abandoned.

FIELD OF THE INVENTION

This invention relates to porous electrically-conductive gasketing materials and, more particularly, to porous electrically-conductive gasketing materials that are coated with an electrically-conductive layer that provides good release from sealing surfaces and that has good electrical conductivity.

BACKGROUND OF THE INVENTION

Porous electrically-conductive gaskets have great value in use as seals for systems with special needs. These gaskets typically comprise a matrix of a non-conductive polymer to which electrically-conductive filler particles have been added and the mixture formed into a porous electrically-conductive composite material. The value of such gasketing materials lie in their ability to prevent or control buildup of electrical and electrostatic charges in a system or to control or prevent penetration of electromagnetic radiation from one side of the sealed system to the other by their electrically conductive nature, while at the same time providing lighter weight gaskets having high conformability to sealing surface irregularities, lower clamping force requirements, and the ability to provide controlled permeability from one side of the sealed system to the other by their porous nature.

Sealing requirements for these materials may vary depending on the use. They may be rigorous, where virtually all of the porosity of the gasket is removed under compression by the sealing surfaces thus providing liquid- or gas-tight seals, for example, in sealing chemical processing vessels, piping and equipment. They may also be used in less rigorous applications where lower compressive forces are applied and in which gasket porosity and permeability to liquids and gases are reduced only to minimally acceptable levels. For example, these may include seals for enclosures of chemical processing equipment, electrical and electronic equipment, analytical instruments and the like, for which there is a desire to permit pressure equilibration from one side of the sealed system to the other while excluding other influences of the ambient environment. In all cases, however, it is necessary that the gasket materials be electrically conductive when clamped in service.

When porous gasketing materials are clamped between metal surfaces they often stick to the surfaces when they are unclamped. This usually results in damage to the gasket material that makes it unsuitable for reuse and, in extreme cases, may result in damage to the metal sealing surfaces if the gasket must be scraped off in order to remove it from the metal sealing surface.

When a porous electrically-conductive gasket material is clamped between aluminum sealing surfaces there is a tendency for the high electrical conductivity between the aluminum sealing surfaces to be substantially reduced over a period of time. This tendency and the tendency to stick to surfaces are very undesirable in gasket materials.

It can be seen then that a porous electrically-conductive gasket material that releases easily from metal surfaces when unclamped and which permits easy removal or reuse would be very desirable.

SUMMARY OF THE INVENTION

This invention provides a porous electrically-conductive sheet or cylindrical material that does not stick to metal surfaces when unclamped after use in gasketing or sealing applications and which provides electrical conductivity between the sealing surfaces when clamped.

The invention comprises a porous electrically-conductive substrate coated on at least one surface with an electrically-conductive layer comprising a polymer matrix having electrically-conductive particles therein.

Porous is used herein to mean that a material contains an appreciable amount of void space or porosity in its uncompressed form. No inferences as to pore size, pore size distribution or permeability of the material are intended.

Electrical-conductivity is used herein to mean that a material conducts electricity while in use, i.e. while under compression. the material may also be conductive in its uncompressed state.

DESCRIPTION OF THE INVENTION

One aspect of the invention involves the use of a thin electrically-conductive coating layer comprising a non-conductive polymer that provides a matrix to bind and fix in place electrically-conductive particles, the coating layer being bonded to at least one surface of a porous electrically-conductive gasket material.

The polymer matrix material of the coating layer may be any polymer having suitable release properties with respect to the sealing surfaces to be used and which can be used to bind and fix in place the electrically-conductive filler particles. It is, preferably, a thermoplastic polymer or, more preferably, a fluoropolymer or, most preferably, a copolymer of tetrafluoroethylene and fluorinated comonomers, such as hexafluoropropylene, perfluoro (propyl vinyl ether), and the like.

The filler particles of the coating layer may be any solid particulate material having sufficiently high electrical conductivity and having chemical compatibility with the matrix polymer of the coating, the gasket substrate and the metal sealing surfaces. They are, preferably, selected from the group of metals commonly used to conduct electricity, for example, aluminum, copper, nickel, silver, gold, etc. or from the group of conductive carbons, for example, carbon blacks, graphite, etc., or, more preferably, from the class consisting of acetylene blacks, for example, Shawinigan acetylene black, UCET acetylene black, etc.

The concentration of the filler particles may range from 3 percent to 90 percent of the total solids in the coating layer but, preferably, are in the range of 10 percent to 50 percent. The materials of the filled coating layer may be applied to the surface(s) of the substrate in dry form but are preferably combined in a liquid medium for application by dipping, spraying, painting, roll coating, or the like. By either method, the coating layer materials are applied in a thin uniform layer. After drying to remove the liquid medium a stronger bond between the coating layer and the substrate may be effected by chemical curing of the polymer matrix material or by heating a thermoplastic polymer matrix material to obtain adhesion to the substrate surface. The finished coating layer may be porous or continuous and is, preferably, less than 25 micrometers in thickness.

The gasket substrate material may be any porous electrically-conductive material, in sheet or cylindrical form, used to provide electrically-conductive seals. The substrate materials may be selected from the classes consisting of elastomers, thermoplastic polymers, fluoropolymers, and the like, which contain electrically-conductive filler particles or, preferably, are porous filled-polytetrafluoroethylene containing electrically-conductive filler particles or, more preferably, porous expanded filled-polytetrafluoroethylene containing electrically-conductive filler particles.

A preferred substrate material is a porous expanded filled-polytetrafluoroethylene containing high-conductivity carbon black filler particles. The amount of conductive filler material in the substrate can range from 3 to 90 weight percent, preferably 10–50%. One suitable tape contains equal parts by weight of polytetrafluoroethylene and filler particles, has a nominal bulk density of 0.34 grams/cc (approximately 85 percent pore volume) and air permeability of approximately 68 Gurley-Seconds.

Air permeability was measured using a Teledyne Gurley High Pressure Densometer—Model 4120. Gurley-Seconds values represent the time, in seconds, required for passage of 10 cc of air through a 1.0 square inch test area at a pressure drop of 12.2 inches of water.

To further illustrate embodiments of the invention the following examples are used:

COMPARATIVE EXAMPLE 1

A 3" diameter test piece of GORE-SHIELD ™ GS-1000 gasketing tape was clamped between clean 311 diameter aluminum electrodes at a clamping force of approximately 50 psi. The electrical resistance through the test piece was measured at intervals over a period of 37 days during which time the clamping force of approximately 50 psi was maintained.

Results: The electrical resistance increased substantially.

| Resistance | - Initial | 370 milliohms |
|---|---|---|
| | - After 24 hours | 440 milliohms |
| | - After 37 days | 3160 milliohms |

The GORE-SHIELD GS-1000 tape is made of equal parts by weight of polytetrafluoroethylene and filler particles, has a nominal bulk density of 0.34 grams/cc (aproximately 85 percent pore volume) and air permeability of approximately 68 Gurley-Seconds.

COMPARATIVE EXAMPLE 2

A 3" diameter test piece of the tape used in Comparative Example 1 was clamped between clean 3" diameter aluminum electrodes at a clamping force of approximately 50 psi and tested. After 24 hours, the fixture was unclamped and the test piece removed.

Results: Slight sticking to the electrode surfaces occurred. The sample was then reclamped at a typical gasketing force of approximately 1000 psi for 24 hours. After 24 hours, the clamping bolts were removed.

Results: The electrode plates could not be separated by hand. The plates were pried apart resulting in severe damage to the test piece. Scraping was required to fully remove the test gasketing from the metal surfaces.

EXAMPLE 1

A coating material was prepared as follows:

In a blender were added and mixed:

| 230 ml | water |
|---|---|
| 10 ml | Zonyl FSN surfactant |
| 50 g | FEP-120 dispersion (an aqueous dispersion of Teflon FEP particles manufactured by E. I. DuPont e Nemours & Co., Inc.) |
| 9.3 g | Shawinigan Acetylene Black (Gulf Oil Canada, Ltd.) |

The coating solution was applied with a paint brush to both surfaces of the tape used in Comparative Example I and heated to 310 degrees C. for 5 minutes; thus fixing in place a thin porous layer on the surfaces of the tape. The coated GS-1000 Gasketing Tape had an air permeability of approximately 67 Gurley Seconds.

A 3" diameter disc was cut from the coated GS-1000 Gasketing Tape, clamped between clean 3" diameter aluminum electrodes at a clamping force of approximately 50 psi and tested.

Results: The electrical resistance was, unexpectedly, very low and remained at low levels.

| Resistance - | Initial | 4 to 5 milliohms |
|---|---|---|
| | After 24 hours | 3 to 4 milliohms |
| | After 11 days | 4 to 5 milliohms |
| | After 20 days | 4 to 5 milliohms |

EXAMPLE 2

A second 3" diameter disc was cut from the coated tape described in Example 1, clamped between clean 3" diameter aluminum electrodes at a clamping force of approximately 1000 psi.

After removal of the clamping bolts the electrode plates separated easily and cleanly from the test gasket and the test gasket was removed undamaged.

EXAMPLE 3

A coating material was prepared as described in Example 1. The coating solution was applied with a paint brush to both surfaces of the tape used in Example 1 and heated to 290 degrees C for 5 minutes. These steps were repeated 4 times and developed a thin low-porosity layer on the surfaces of the tape. The finished coating layer had a thickness of approximately 8 micrometers and had air permeability of approximately 700 Gurley Seconds.

A 3" diameter disc was cut from the coated GS-1000 Gasketing Tape, clamped between clean 311 diameter aluminum electrodes at a clamping force of approximately 50 psi and tested.

Results: The electrical resistance was again unexpectedly lowered and remained at low levels.

| Resistance - | Initial | 4.5 to 5.5 milliohms |
|---|---|---|
| | After 24 hours | 4.5 to 5.5 milliohms |

EXAMPLE 4

A coating material was prepared as follows:
In a blender were added and mixed:

| 112 ml | Water |
|---|---|
| 50 g | FEP-120 dispersion |

-continued

| | |
|---|---|
| 38.5 g | Nickel-coated Graphite particles |

The coating solution was applied with a paint brush to both surfaces of the tape used in Example 3 and heated to 290 degrees C. for 5 minutes; thus fixing in place a thin porous layer on the surfaces of the tape. The coated GS-1000 Gasketing Tape had an air permeability of approximately 78 Gurley Seconds.

A 3" diameter disc was cut from the coated GS-1000 Gasketing Tape, clamped between clean 3" diameter aluminum electrodes at a clamping force of approximately 50 psi and tested.

Results: The resistance was again unexpectedly lowered and remained at low levels.

| Resistance - Initial | 6 to 7 milliohms |
|---|---|
| After 15 hours | 6 to 7 milliohms |
| After 5 days | 6 to 7 milliohms |
| After 7 days | 5 to 6 milliohms |

We claim:

1. A gasket comprising:
   a) a substrate layer of porous expanded polytetrafluoroethylene having electrically conductive particles therein,
   b) a coating on said substrate comprising a copolymer of tetrafluoroethylene and a fluorinated comonomer having electrically-conductive particles therein;
   wherein the gasket is electrically conductive; and
   wherein the gasket resists adhesion to surfaces between which it is compressed.

2. The gasket of claim 1 wherein the copolymer is selected from the class consisting of tetrafluoroethylene/hexafluoropropylene and tetrafluoroethylene/perfluoro (propyl vinyl ether).

3. The gasket of claims 1 or 2 wherein the conductive particles are selected from the class consisting of carbon and metals.

4. The gasket of claim 3 wherein the conductive particles of the coating are acetylene black.

5. The gasket of claim 1 wherein the gasket's electrical resistance is low and remains low over time.

6. A gasket attached between sealing surfaces which comprises:
   a substrate of porous polytetrafluoroethylene (PTFE) including electrically conductive particles therein;
   a coating of fluorinated thermoplastic copolymer including electrically conductive particles therein, the coating being applied to the substrate;
   wherein the gasket is conductive of electrical charges between the sealing surfaces, such conductivity remaining essentially constant over time; and
   wherein the coating on the gasket serves to resist adhesion to the sealing surfaces.

* * * * *